US012658512B2

(12) United States Patent
Lim et al.

(10) Patent No.: US 12,658,512 B2
(45) **Date of Patent: *Jun. 16, 2026**

(54) SECONDARY BATTERY AND BATTERY MODULE INCLUDING THE SAME

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Hyung-Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,417

(22) Filed: Feb. 27, 2024

(65) Prior Publication Data

US 2024/0429506 A1      Dec. 26, 2024

Related U.S. Application Data

(63) Continuation of application No. 18/026,302, filed as application No. PCT/KR2021/018560 on Aug. 12, 2021, now Pat. No. 11,916,240.

(30) Foreign Application Priority Data

Dec. 8, 2020    (KR) ........................ 10-2020-0170441
Nov. 2, 2021    (KR) ........................ 10-2021-0148399

(51) Int. Cl.
*H01M 50/178*          (2021.01)
*H01M 50/188*          (2021.01)
(Continued)

(52) U.S. Cl.
CPC ....... *H01M 50/178* (2021.01); *H01M 50/188* (2021.01); *H01M 50/197* (2021.01); *H01M 50/394* (2021.01); *H01M 2200/20* (2013.01)

(58) Field of Classification Search
CPC ............. H01M 50/178; H01M 50/394; H01M 50/188; H01M 50/197; H01M 2200/20
(Continued)

(56) References Cited

U.S. PATENT DOCUMENTS

2006/0257717 A1    11/2006    Huang
2008/0070115 A1*    3/2008    Saruwatari ............ H01M 4/661
                                                    429/211

(Continued)

FOREIGN PATENT DOCUMENTS

CN          1862856 A      11/2006
CN        106714946 A       5/2017
(Continued)

OTHER PUBLICATIONS

International Search Report for PCT/KR2021/018560 mailed Mar. 17, 2022. 3 pgs.
(Continued)

*Primary Examiner* — Timothy J Thompson
*Assistant Examiner* — Michael F McAllister
(74) *Attorney, Agent, or Firm* — Lerner David LLP

(57)          ABSTRACT

Disclosed is a secondary battery including: an electrode assembly including electrode sheets and a separator interposed between the electrode sheets; a pouch-like battery casing in which the electrode assembly is received; an electrode lead connected to the electrode assembly and protruding out from the battery casing; and a lead film covering the electrode lead and interposed between the electrode lead and the battery casing, wherein the lead film includes an outer layer covering the electrode lead and an inner layer disposed inside of the outer layer, and the inner layer includes a material having a higher air permeability as compared to the outer layer.

26 Claims, 10 Drawing Sheets

(51) Int. Cl.
H01M 50/197 (2021.01)
H01M 50/30 (2021.01)
(58) Field of Classification Search
USPC ........................................................ 361/688
See application file for complete search history.

(56) References Cited

U.S. PATENT DOCUMENTS

| | | | | |
|---|---|---|---|---|
| 2010/0221601 | A1 | 9/2010 | Fukuda | |
| 2010/0285368 | A1 | 11/2010 | Yamamoto et al. | |
| 2013/0216867 | A1* | 8/2013 | Schaefer ............. | H01M 50/129 |
| | | | | 429/61 |
| 2014/0011060 | A1 | 1/2014 | Yang et al. | |
| 2016/0028068 | A1* | 1/2016 | Yang .................... | H01M 50/178 |
| | | | | 429/61 |
| 2017/0040635 | A1* | 2/2017 | Choi .................. | B23K 35/0255 |
| 2017/0133647 | A1 | 5/2017 | Fukuoka et al. | |
| 2018/0053976 | A1* | 2/2018 | Park ........................ | H01M 4/13 |
| 2018/0114964 | A1 | 4/2018 | Kim et al. | |
| 2018/0198109 | A1* | 7/2018 | Kim .................... | H01M 50/121 |
| 2020/0321577 | A1 | 10/2020 | Kim et al. | |
| 2021/0234222 | A1 | 7/2021 | Hiraki et al. | |

FOREIGN PATENT DOCUMENTS

| | | | | |
|---|---|---|---|---|
| JP | 1024506 | A | † | 1/1998 |
| JP | H10-24506 | A | | 1/1998 |
| JP | 2007-184189 | A | | 7/2007 |
| JP | 2008166833 | A | | 7/2008 |
| JP | 2010262860 | A | | 11/2010 |
| JP | 2014-110114 | A | | 6/2014 |
| JP | 2014210841 | A | | 11/2014 |
| JP | 2014212034 | A | | 11/2014 |
| JP | 2015511060 | A | | 4/2015 |
| JP | 2016026380 | A | | 2/2016 |
| JP | 2016-186873 | A | | 10/2016 |
| JP | 2017033706 | A | | 2/2017 |
| JP | 2021096952 | A | | 6/2021 |
| KR | 20090017706 | A | | 2/2009 |
| KR | 20130126107 | A | | 11/2013 |
| KR | 20150135878 | A | | 12/2015 |
| KR | 101904587 | B1 | | 10/2018 |
| KR | 20190123059 | A | | 10/2019 |
| KR | 102066013 | B1 | | 1/2020 |
| WO | 2018110067 | A1 | | 6/2018 |
| WO | 2019244971 | A1 | † | 6/2020 |

OTHER PUBLICATIONS

Third Party Observation for Application No. 21903848.6, dated Mar. 11, 2025, 13 pages.

* cited by examiner
† cited by third party

<u>100</u>

SECONDARY BATTERY AND BATTERY MODULE INCLUDING THE SAME

CROSS-REFERENCE TO RELATED APPLICATIONS

The present application is a continuation of U.S. application Ser. No. 18/026,302, filed on Mar. 14, 2023, which is a national phase entry under 35 U.S.C. § 371 of the International Application No. PCT/KR2021/018560 filed on Dec. 8, 2021, which claims priority from Korean Patent Application No. 10-2020-0170441 filed on Dec. 8, 2020 and Korean Patent Application No. 10-2021-0148399 filed on Nov. 2, 2021, the disclosures of which are incorporated herein by reference in their entireties.

FIELD OF THE INVENTION

The present disclosure relates to a secondary battery and a battery module including the same. Particularly, the present disclosure relates to a secondary battery capable of discharging gases generated inside thereof and a battery module including the same.

BACKGROUND OF THE INVENTION

Recently, as fossil fuels are depleted, the price of energy sources is rising, interest in environmental pollution is increasing, and a need for eco-friendly alternative energy sources becomes an essential factor for the future life. Under these circumstances, studies about various power generation technologies, such as nuclear power, solar light, wind power and tidal power, have continued. Also, electric power storage systems for utilizing the energy generated as mentioned above more efficiently have been given continuous attentions.

Particularly, as technical development and demand for mobile instruments have been increased, batteries as energy sources have been increasingly in demand. Therefore, many studies have been conducted about batteries that meet various needs.

Typically, there is a high demand for lithium secondary batteries, such as lithium-ion batteries and lithium-ion polymer batteries, having such advantages as high energy density, discharge voltage and output stability.

Secondary batteries may be classified according to the structure of the electrode assembly including a stacked structure of a positive electrode, a negative electrode and a separator interposed between the positive electrode and the negative electrode. Typically, secondary batteries may include a jelly-roll type electrode assembly having a structure formed by winding elongated sheet-like positive electrodes and negative electrodes with separators interposed therebetween, a stacked electrode assembly formed by sequentially stacking a plurality of positive electrodes and negative electrodes cut into a predetermined size of unit with separators interposed therebetween, or the like. Recently, to solve the problems of the jelly-roll type electrode assembly and the stacked electrode assembly, a stacked/folded electrode assembly has been developed as a combination of jelly-roll type and stacked type, and the stacked/folded electrode assembly has a structure formed by sequentially winding unit cells formed by stacking a predetermined unit of positive electrodes and negative electrodes with separators interposed therebetween, while the unit cells are disposed on a separator film.

In addition, secondary batteries may be classified, according to the shape of the casing, into cylindrical secondary batteries including an electrode assembly received in a cylindrical casing, prismatic secondary batteries including an electrode assembly received in a prismatic casing, and pouch-type secondary batteries including an electrode assembly received in a pouch-type casing made of a laminate sheet.

BRIEF SUMMARY OF THE INVENTION

As the energy density of a secondary battery is increased, the amount of gases generated inside of the secondary battery is also increased. Particularly, in the case of a pouch-type secondary battery, when the internal pressure is increased due to the gases generated in the battery and exceeds a limit of fusion strength of the pouch-type casing, the secondary battery may be released from sealing, and thus the internal gases may be discharged. In this case, there is a problem in that the life of the second battery is reduced significantly. Therefore, there is a need for solving such a problem.

The present disclosure is designed to solve the problems of the related art, and therefore the present disclosure is directed to providing a secondary battery capable of discharging the gases generated inside thereof effectively, and a battery module including the same.

However, the problems to be solved by the embodiments of the present disclosure are not limited to the above-mentioned problem, but may be expanded diversely within the scope of the present disclosure.

In one aspect of the present disclosure, there is provided a secondary battery according to any one of the following embodiments.

According to the first embodiment, there is provided a secondary battery including: an electrode assembly including electrode sheets and a separator interposed between the electrode sheets; a pouch-like battery casing in which the electrode assembly is received; an electrode lead connected to the electrode assembly and protruding out from the battery casing; and a lead film covering the electrode lead and interposed between the electrode lead and the battery casing, wherein the lead film includes an outer layer covering the electrode lead and an inner layer disposed inside of the outer layer, and the inner layer includes a material having a higher air permeability as compared to the outer layer.

According to the second embodiment, there is provided the secondary battery as defined in the first embodiment, wherein the outer surface of the inner layer and the inner surface of the outer layer are adhered to each other.

According to the third embodiment, there is provided the secondary battery as defined in the first or the second embodiment, wherein one end of the inner layer is exposed to the outside in the external part of the battery casing, and the other end of the inner layer is covered with the outer layer in the internal part of the battery casing.

According to the fourth embodiment, there is provided the secondary battery as defined in the first or the second embodiment, wherein one end of the inner layer is exposed to the outside in the external part of the battery casing, and the other end of the inner layer is exposed to the internal space of the battery casing in the internal part of the battery casing.

According to the fifth embodiment, there is provided the secondary battery as defined in the first or the second embodiment, wherein one end of the inner layer is covered with the outer layer in the external part of the battery casing, and the other end of the inner layer is exposed to the internal space of the battery casing in the internal part of the battery casing.

According to the sixth embodiment, there is provided the secondary battery as defined in the first or the second embodiment, wherein one end of the inner layer is covered with the outer layer in the external part of the battery casing, and the other end of the inner layer is covered with the outer layer in the internal part of the battery casing.

According to the seventh embodiment, there is provided the secondary battery as defined in the fifth or the sixth embodiment, wherein the lead film of the outer layer covering one end of the inner layer in the external part of the battery casing has a width of 2 mm or more in the direction of extension of the electrode lead.

According to the eighth embodiment, there is provided the secondary battery as defined in any one of the first to the seventh embodiments, wherein the outer layer has a thickness of 100-300 μm between the inner layer and the battery casing.

According to the ninth embodiment, there is provided the secondary battery as defined in any one of the first to the eighth embodiments, wherein the inner layer has a thickness of 50-150 μm.

According to the tenth embodiment, there is provided the secondary battery as defined in any one of the first to the ninth embodiments, wherein the outer layer has a gas permeability of 4-40 barrier at 60° C.

According to the eleventh embodiment, there is provided the secondary battery as defined in any one of the first to the tenth embodiments, wherein the outer layer has a water infiltration amount of 0.02-0.2 g at 25° C. and 50% RH for 10 years.

According to the twelfth embodiment, there is provided the secondary battery as defined in any one of the first to the eleventh embodiments, wherein the inner layer has a gas permeability of $1.6\ e^5$ to $1.6\ e^7$ barrier.

According to the thirteenth embodiment, there is provided the secondary battery as defined in any one of the first to the twelfth embodiments, wherein the outer layer includes a polyolefin-based resin, and the polyolefin-based resin includes at least one material selected from the group consisting of polypropylene, polyethylene and polyvinyl difluoride (PVDF).

According to the fourteenth embodiment, there is provided the secondary battery as defined in any one of the first to the thirteenth embodiments, wherein the inner layer includes at least one material selected from the group consisting of polyolefin-based resin, fluorinated resin, natural materials, glass fibers, ceramic fibers and metal fibers.

According to the fifteenth embodiment, there is provided the secondary battery as defined in the fourteenth embodiment, wherein the polyolefin-based resin includes at least one material selected from the group consisting of polypropylene, polyethylene and polyvinyl difluoride (PVDF), the fluorinated resin includes at least one material selected from the group consisting of polytetrafluoroethylene and polyvinylidene fluoride, and the natural material includes at least one material selected from the group consisting of cotton and wool.

According to the sixteenth embodiment, there is provided the secondary battery as defined in any one of the first to the fifteenth embodiments, wherein the outer layer is partially disposed between the inner layer and one surface of the electrode lead.

According to the seventeenth embodiment, there is provided the secondary battery as defined in any one of the first to the sixteenth embodiments, wherein the battery casing includes an upper casing and a lower casing, the upper sealing portion of the upper casing and the lower sealing portion of the lower casing are bound to each other, and the lead film is disposed between the upper sealing portion and the lower sealing portion.

According to the eighteenth embodiment, there is provided the secondary battery as defined in the seventeenth embodiment, wherein the lead film is formed to have a larger length as compared to the upper sealing portion and the lower sealing portion in the direction of protrusion of the electrode lead, and the lead film is exposed in each of the internal part and external part of the battery casing.

According to the nineteenth embodiment, there is provided the secondary battery as defined in the eighteenth embodiment, wherein the area of the lead film exposed outside of the battery casing is the same as the area of the lead film exposed inside of the battery casing.

According to the twentieth embodiment, there is provided the secondary battery as defined in the eighteenth embodiment, wherein the area of the lead film exposed outside of the battery casing is larger than the area of the lead film exposed inside of the battery casing.

According to the twenty-first embodiment, there is provided the secondary battery as defined in any one of the seventeenth to the twentieth embodiments, wherein the outer layer includes an upper outer layer disposed between the upper sealing portion and the electrode lead, and a lower outer layer disposed between the lower sealing portion and the electrode lead.

According to the twenty-second embodiment, there is provided the secondary battery as defined in the twenty-first embodiment, wherein the inner layer includes an upper inner layer covered with the upper outer layer, and a lower inner layer covered with the lower outer layer.

According to the twenty-third embodiment, there is provided the secondary battery as defined in the twenty-second embodiment, wherein the upper outer layer includes a first upper outer layer and a second upper outer layer, and the upper inner layer is disposed between the first upper outer layer and the second upper outer layer.

According to the twenty-fourth embodiment, there is provided the secondary battery as defined in the twenty-second or the twenty-third embodiment, wherein the lower outer layer includes a first lower outer layer and a second lower outer layer, and the lower inner layer is disposed between the first lower outer layer and the second lower outer layer.

According to the twenty-fifth embodiment, there is provided the secondary battery as defined in any one of the first to the twenty-fourth embodiments, wherein the inner layer is in contact with one surface of the electrode lead.

In another aspect of the present disclosure, there is provided a battery module according to the following embodiment.

According to the twenty-sixth embodiment, there is provided a battery module including the secondary battery as defined in the first embodiment.

According to the present disclosure, it is possible to discharge the gases generated inside of a secondary battery effectively by providing a lead film having high air permeability in the vicinity of an electrode lead.

The effects of the present disclosure are not limited to the above-mentioned effect, but the other effects not mentioned herein will become more fully apparent from the description of the present disclosure.

DETAILED DESCRIPTION

Figure 1:
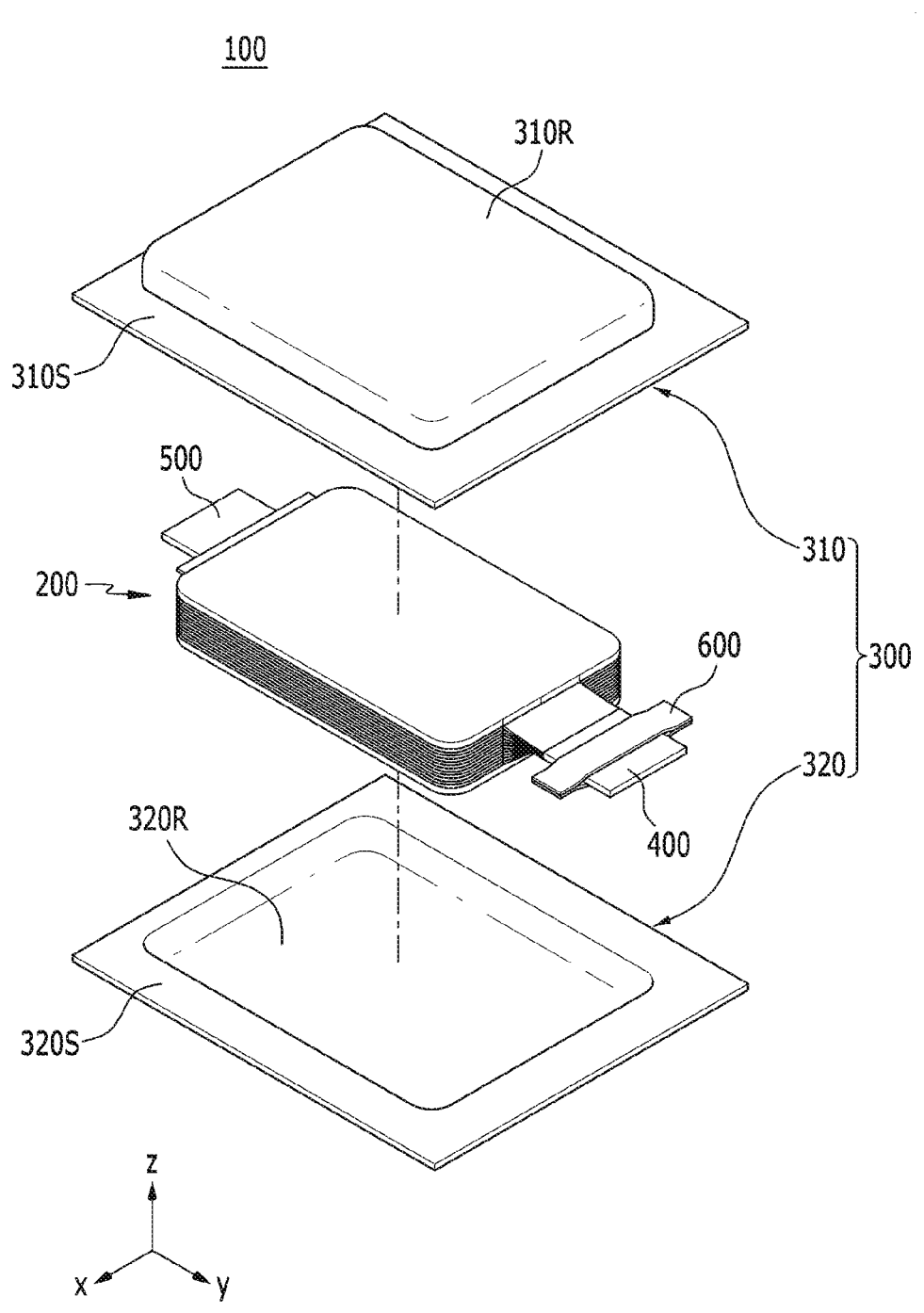
FIG. 1 is an exploded perspective view of the secondary battery according to an embodiment of the present disclosure.

Hereinafter, preferred embodiments of the present disclosure will be described in detail with reference to the accompanying drawings so that the present disclosure will be easily implemented by those skilled in the art. The present disclosure may, however, be embodied in many different forms and should not be construed as limited to the exemplary embodiments set forth therein.

In the description, details of well-known features and techniques may be omitted to avoid unnecessarily obscuring the presented embodiments, and the same or a similar constitutional element is marked with the same drawing numeral.

In addition, each element in the accompanying drawings is shown optionally in terms of size and thickness for the convenience of description, and thus the scope of the present disclosure is not limited to what is shown in drawings. In the drawings, several layers and regions are exaggerated in thickness for the purpose of clear presentation. Further, for the convenience of description, a part of layers and regions is exaggerated in thickness in the drawings.

Additionally, the expression "a part, such as a layer, film, region or plate, is present 'on' another part" covers that the part is present directly on another part, as well as the part is present on another part with still another part interposed between them. On the other hand, the expression "a part is present 'directly on' another part" means that there is no part between them. Further, the expression "is present 'on' a part as a standard" covers the expression "is present above or below the part as a standard", and does not necessarily mean the expression "is present on or blow toward the direction opposite to the gravity direction.

Throughout the specification, the expression 'a part includes an element' does not preclude the presence of any additional elements but means that the part may further include the other elements.

In addition, throughout the specification. The term 'planar' means the planar shape of an object as viewed from the above, and the term 'sectional' means the vertical section of an object as viewed from the lateral side.

Figure 2:
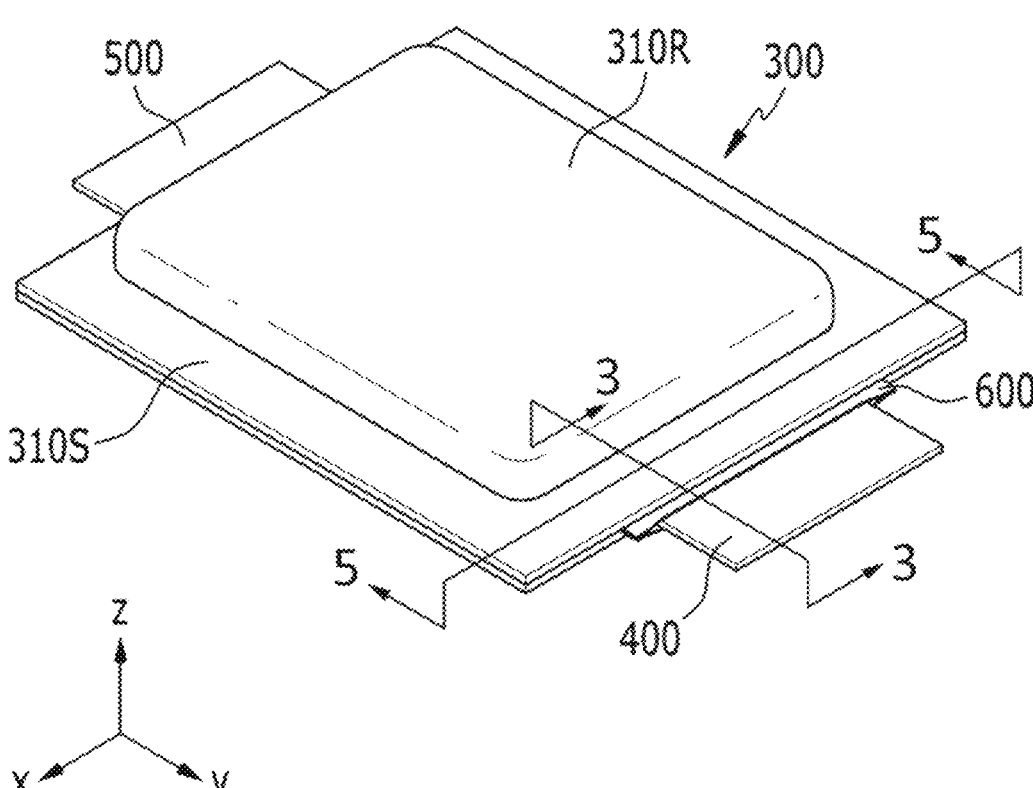
FIG. 2 is a perspective view illustrating the secondary battery as shown in FIG. 1, after sealing.
Figure 3:
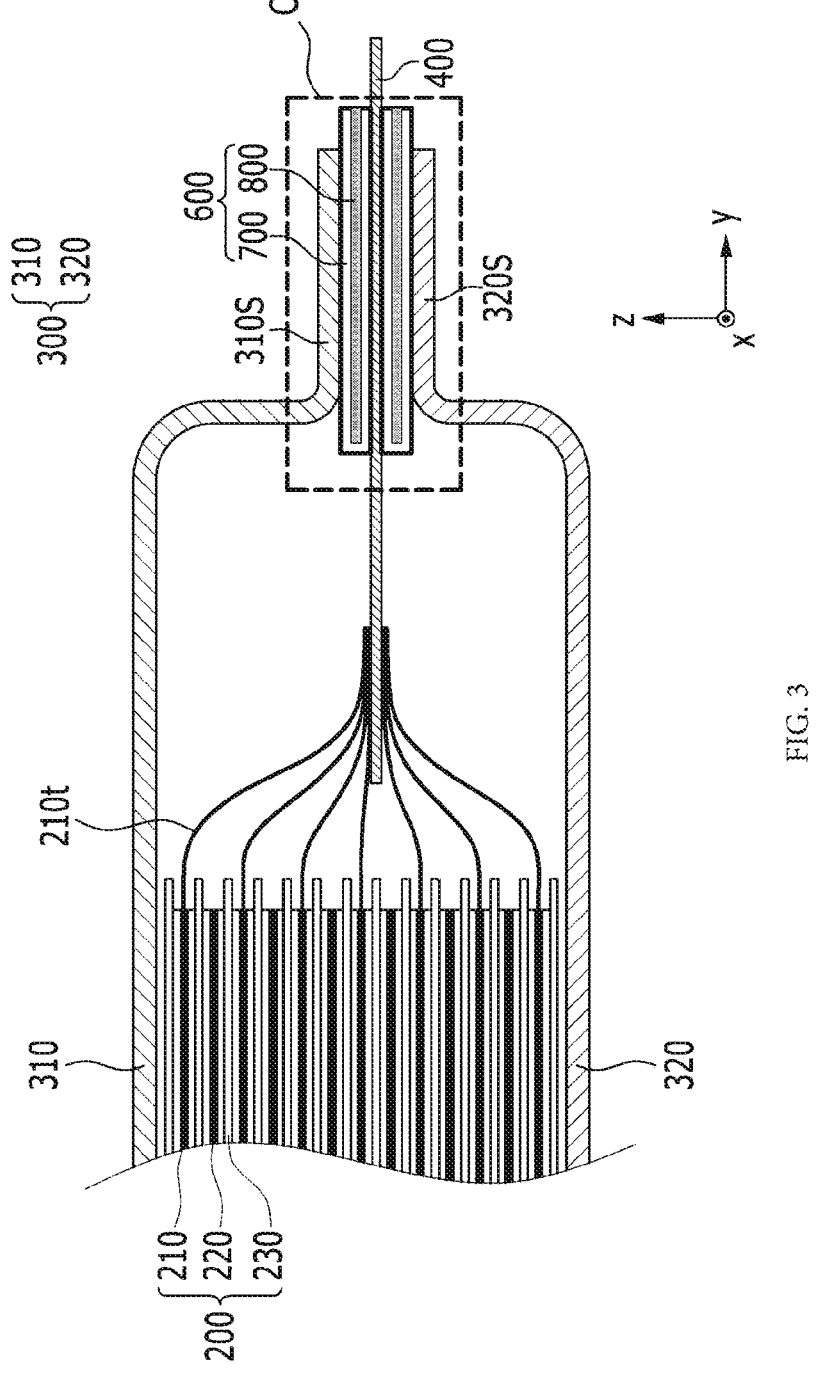
FIG. 3 is a sectional view taken along line 3-3 in FIG. 2.

FIG. 1 is an exploded perspective view of the secondary battery according to an embodiment of the present disclosure. FIG. 2 is a perspective view illustrating the secondary battery as shown in FIG. 1, after sealing. FIG. 3 is a sectional view taken along line 3-3 in FIG. 2.

Referring to FIGS. 1-3, the secondary battery 100 according to an embodiment of the present disclosure includes: an electrode assembly 200 including electrode sheets 210, 220 and a separator 230 interposed between the electrode sheets 210, 220; a pouch-like battery casing 300 in which the electrode assembly 200 is received; an electrode lead 400, 500 connected to the electrode assembly 200 and protruding out from the battery casing; and a lead film 600 covering the electrode lead 400, 500 and interposed between the electrode lead 400, 500 and the battery casing 300.

First, the electrode assembly 200 includes electrode sheets 210, 220 having an electrode tab 210*t* and a separator 230 interposed between the electrode sheets 210, 220. Particularly, the electrode assembly 200 according to this embodiment may be a stacked electrode assembly, a jelly-roll type electrode assembly or a stacked/folded electrode assembly. In FIG. 3, a stacked electrode assembly is shown as an example. Particularly, the stacked electrode assembly may have a structure including a plurality of electrode sheets 210, 220 stacked with a separator interposed between the electrode sheets.

Each electrode sheet 210, 220 may be formed by coating an electrode active material on an electrode current collector, and a part of the electrode current collector may protrude so that an electrode tab 210*t* may be provided. The electrode sheets 210, 220 may be divided into a positive electrode sheet and a negative electrode sheet, and a separator 230 may be interposed between the positive electrode sheet and the negative electrode sheet. For example, one electrode sheet 210 may be a positive electrode sheet, and the electrode tab 210*t* protruding out therefrom may be a positive electrode tab. The other electrode sheet 220 may be a negative electrode sheet, and the electrode tab (not shown) protruding out therefrom may be a negative electrode tab.

In addition, according to this embodiment, the electrode tab may be connected to the electrode lead. For example, the electrode tabs 210 having one type of polarity may be bound to one electrode lead 400, and the electrode tabs (not shown) having the other type of polarity may be bound to the other electrode lead 500. The electrode leads 400, 500 may protrude out from both ends of the battery casing 300. In FIG. 1 and FIG. 2, it is shown that two electrode leads 400, 500 protrude in the opposite directions. However, the protruding direction is not particularly limited. In other words, two electrode leads 400, 500 may protrude out from one side of the secondary battery 100 in the same direction. One of the two electrode leads 400, 500 may be a positive electrode lead, and the other may be a negative electrode lead. For example, when the electrode tab 210*t* shown in FIG. 3 is a positive electrode tab, the electrode lead 400 connected thereto may be a positive electrode lead.

Meanwhile, the battery casing 300 may be a pouch-type casing. The battery casing 300 may include an upper casing 310 and a lower casing 320 coupled to each other. Although it is not particularly shown, the battery casing 300 including the upper casing 310 and the lower casing 320 may be a laminate sheet including a resin layer and a metal layer. Particularly, each of the upper casing 310 and the lower casing 320 may include an inner resin layer for sealing, a metal layer for preventing infiltration of a material, and an outer resin layer as the outermost layer.

The outer resin layer may have high tensile strength and weather resistance based on its thickness to protect the pouch-type secondary battery 100 from the outside, and may show electrical insulating property. The outer resin layer may include polyethylene terephthalate (PET) resin or nylon resin. The metal layer prevents introduction of air or moisture to the internal part of the pouch-type secondary battery 100. The metal layer may include aluminum (Al). The inner resin layer may be bonded by the heat and pressure applied thereto, while the electrode assembly 200 is received in the battery casing. The inner resin layer may include casted polypropylene (CPP) or polypropylene (PP).

Each of the upper casing 310 and the lower casing 320 may have a concave receiving portion 310R, 320R capable of receiving the electrode assembly 200, and the electrode assembly 200 may be received stably therein. There is no particular limitation in the method for forming such receiving portions 310R, 320R, and a dip drawing process using a pressurizing punch may be used.

A sealing portion 310S, 320S may be provided along the outer circumference of the receiving portion 310R, 320R of each of the upper casing 310 and the lower casing 320. The upper sealing portion 310S of the upper casing 310 and the lower sealing portion 320S of the lower casing 320 may be bound to each other so that the battery casing 3000 may be sealed. Particularly, the inner resin layer of the upper sealing portion 310S and the inner resin layer of the lower sealing portion 320S may be partially molten by the heat and pressure and bound to each other, while the inner resin layers face to each other. In other words, the binding between the upper sealing portion 310S and the lower sealing portion 320S, or the binding of the upper sealing portion 310S, the lower sealing portion 320S and the lead film 600 as described hereinafter may correspond to hot fusion of binding the resin layers to each other by applying heat and pressure thereto.

Meanwhile, in FIG. 1, the upper casing 310 and the lower casing 320 each having a receiving portion and separated from each other are shown. However, it is possible to use a pouch casing made of a laminate sheet, wherein one side of the upper casing and one side of the lower casing are formed integrally with each other. It is also possible to use a pouch casing having a sheet-like structure in which any one of the upper casing and the lower casing has a receiving portion and the other has no receiving portion.

Hereinafter, the lead film 600 will be explained in more detail with reference to FIGS. 3-5. To avoid repetition of description, merely one electrode lead 400 of the two electrode leads 400, 500 will be explained, but the structure of the lead film 600 may also be formed in the other electrode lead 500.

Figure 4:
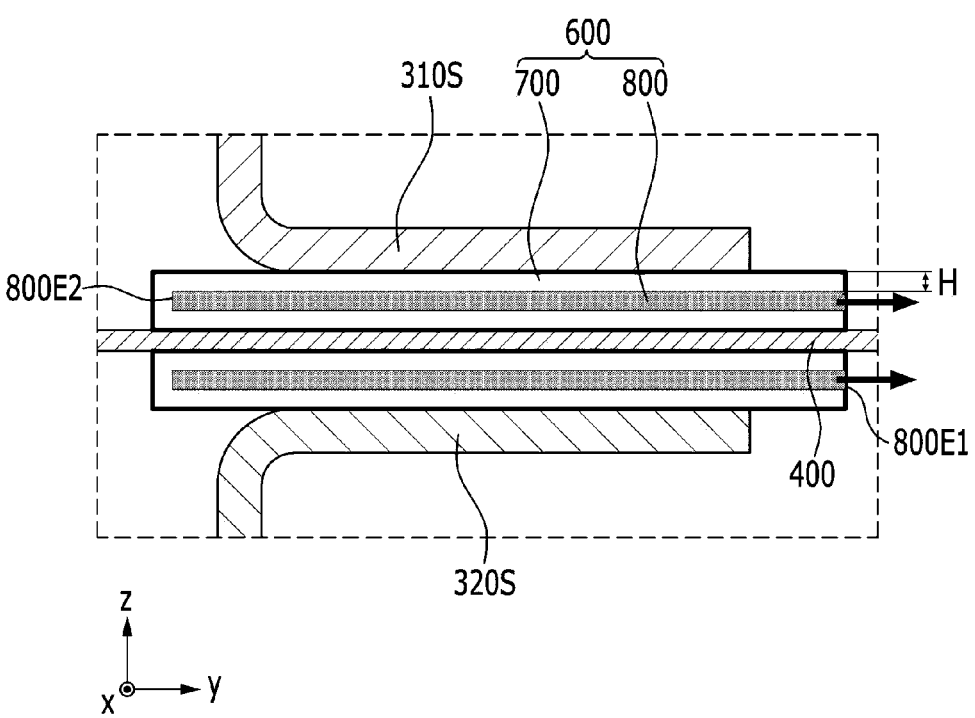
FIG. 4 is a partial sectional view taken by enlarging portion "C" in FIG. 3.

FIG. 4 is a partial sectional view taken by enlarging portion "C" in FIG. 3. FIG. 5 is a sectional view taken along line 5-5 in FIG. 2.

Figure 5:
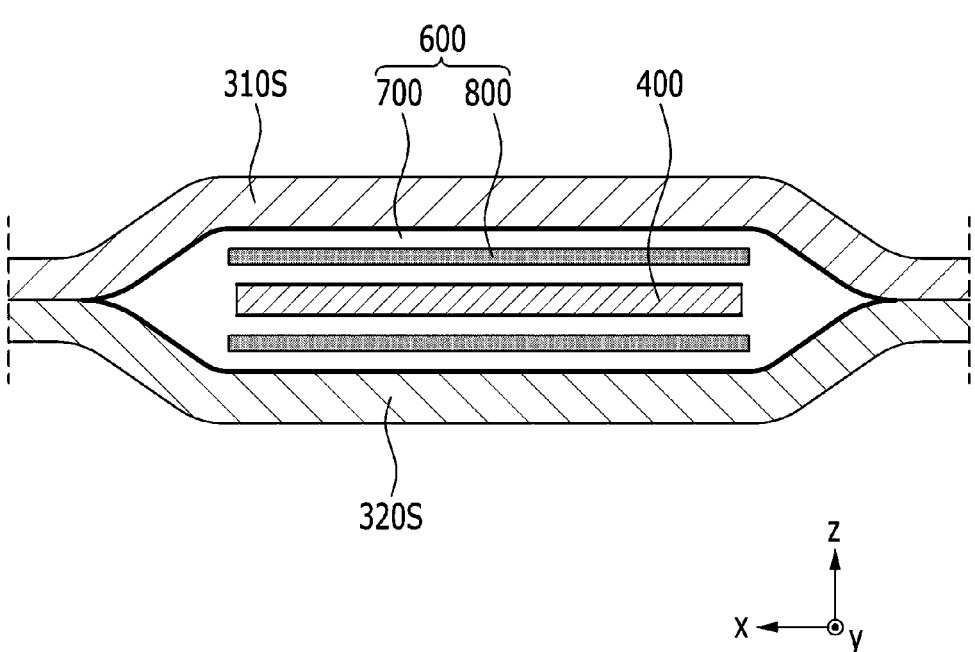
FIG. 5 is a sectional view taken along line 5-5 in FIG. 2.

Referring to FIGS. 3-5, the lead film 600 is formed to cover the electrode lead 400. The lead film 600 includes an outer layer 700 covering the electrode lead 400 and an inner layer 800 disposed inside of the outer layer 700. The expression 'the inner layer 800 is disposed inside of the outer layer 700' means that the outer layer 700 is disposed in such a manner that it may cover at least a part of the outer surface of the inner layer 800.

In addition, the lead film 600 may be disposed between the upper sealing portion 310S of the upper casing 310 and the lower sealing portion 320S of the lower casing 320. The lead film 600 may be disposed at a portion corresponding to a partial region of the upper sealing portion 310S and the lower sealing portion 320S. In other words, in the region free from the lead film 600, the inner resin layer of the upper sealing portion 310S and the inner layer of the lower sealing portion 320S face to each other and are bound to each other. However, in the region where the lead film 600 is disposed, each of the inner resin layer of the upper sealing portion 310S and the inner resin layer of the lower sealing portion 320S may be bound to the outer layer of the lead film 600.

Particularly, the outer layer 700 in this embodiment is for the purpose of enhancing adhesiveness and sealability, and thus it can prevent generation of a short-circuit between the electrode lead 400, 500 and the metal layer of the battery casing 300 and can improve the sealability of the pouch-type battery casing 300. When the metallic electrode lead 400, 500 is in contact with the inner resin layer of the upper sealing portion 310S or the inner resin layer of the lower sealing portion 320S, there is relatively high contact resistance to cause degradation of surface adhesion. However, when the outer layer 700 is provided according to this embodiment, it is possible to prevent such degradation of adhesion. In addition, since the outer layer 700 has insulation property, it is possible to interrupt application of electric current from the electrode lead 400, 500 to the metal layer of the pouch-type battery casing.

In addition, the outer layer 700 may function to facilitate discharge of the gases generated inside of the secondary battery, together with the inner layer 800.

According to an embodiment of the present disclosure, the outer layer 700 may have a gas permeability of 4-40 barrier, 5-20 barrier, or 4-12 barrier, at 60° C. For example, the outer layer 700 may have a carbon dioxide permeability satisfying the above-defined range. In addition, the outer layer 700 may have a gas permeability satisfying the above-defined range at 60° C., based on a thickness of 200 μm. When the outer layer 700 has a gas permeability satisfying the above-defined range, it is possible to discharge the gases generated inside of a secondary battery more effectively.

Herein, the gas permeability may be determined as follows. Two types of secondary batteries equipped with a gas line to which gases may be injected from the outside are prepared. One type of secondary battery is completely sealed, except the gas line. The other type of secondary battery is sealed, while a hole is formed and the outer layer or the inner layer is attached thereto. Then, after injecting gas through the gas line from the outside, a difference in a change in internal pressure between the battery having no outer layer or inner layer and the battery provided with the outer layer or inner layer is determined. Herein, the gas permeability of the outer layer or the inner layer may be determined through the correlation equation between a change in pressure and gas injection amount. For example, the gas injected from the outside may be carbon dioxide.

According to an embodiment of the present disclosure, the outer layer 700 may have a moisture infiltration amount of 0.02-0.2 g, 0.02-0.04 g, or 0.06-0.15 g, at 25° C. and 50% RH for 10 years. For example, when polypropylene is used as the outer layer 700, the outer layer may have a moisture infiltration amount of 0.06-0.15 g. When the moisture infiltration amount of the outer layer 700 satisfies the above-defined range, it is possible to prevent infiltration of moisture introduced from the outer layer 700 more effectively.

According to an embodiment of the present disclosure, the outer layer 700 may have a gas permeability of 4-40 barrier at 60° C. and a moisture infiltration amount of 0.02-0.2 g at 25° C. and 50% RH for 10 years. When the gas permeability and moisture infiltration amount of the outer layer 700 satisfy the above-defined ranges, it is possible to prevent infiltration of moisture from the outside more effectively, while discharging the gases generated inside of a secondary battery.

The moisture infiltration amount of the outer layer may be determined by the method of ASTM F 1249. Herein, a system certified officially by MCOON Co. may be used for the determination of the moisture infiltration amount.

According to an embodiment of the present disclosure, the outer layer 700 may include a polyolefin-based resin. For example, the outer layer 700 may include a polyolefin-based resin satisfying the above-defined range of gas permeability and/or moisture infiltration amount. The polyolefin-based resin may include at least one material selected from the group consisting of polypropylene, polyethylene and polyvinyl difluoride (PVDF). When the outer layer 700 includes polypropylene, the outer layer 700 may have a gas permeability of 4-40 barrier at 60° C. with ease.

Referring to FIG. 4, according to an embodiment of the present disclosure, the outer layer 700 disposed between the inner layer 800 and the battery casing 300 may have a thickness H of 100-300 μm, or 100-200 μm. When the outer layer 700 satisfies the above-defined range of thickness, the gases inside of the battery casing 300 may be discharged to the outside more easily.

Meanwhile, the inner layer 800 according to this embodiment is for the purpose of discharging gases, and the inner layer 800 may include a material having a relatively higher air permeability, i.e. gas permeability, as compared to the outer layer 700. In this manner, the gases generated inside of the battery during charge/discharge may be discharged to the outside through the inner layer 800. The expression 'higher air permeability' refers to a relatively larger amount of gas permeation, when the gases having a predetermined pressure are permeated in one direction. For example, the inner layer 800 may include a more porous material as compared to the outer layer 700. In other words, the inner layer 800 may include a material having a higher ratio of pores per unit volume as compared to the outer layer 700.

According to an embodiment of the present disclosure, the inner layer 800 may have a gas permeability of $1.6 \, e^5$ to $1.6 \, e^7$ barrier, or $1 \, e^6$ to $3 \, e^6$ barrier. For example, the inner layer 800 may have a carbon dioxide permeability satisfying the above-defined range.

According to an embodiment of the present disclosure, the inner layer 800 may include at least one material selected from the group consisting of a polyolefin-based resin, fluorinated resin, natural materials, glass fibers, ceramic fibers and metal fibers. For example, the inner layer 800 may include at least one material selected from the group consisting of a polyolefin-based resin, fluorinated resin, natural material, glass fibers, ceramic fibers and metal fibers satisfying the above-defined range of gas permeability. The polyolefin-based resin may include at least one material selected from the group consisting of polypropylene, polyethylene and polyvinyl difluoride (PVDF). The fluorinated resin may include at least one material selected from the group consisting of polytetrafluoroethylene and polyvinylidene fluoride, and the natural material may include at least one material selected from the group consisting of cotton and wool.

According to an embodiment of the present disclosure, the inner layer 800 may have a thickness of 50-150 μm, or 50-100 μm. When the inner layer 800 has a thickness satisfying the above-defined range, the gases inside of the battery casing 300 may be discharged to the outside more easily.

As shown in FIG. 4 and FIG. 5, the inner layer 800 may be disposed inside of the outer layer 700. Particularly, the inner layer 800 may be covered with the outer layer 700 in the direction of x axis or z axis perpendicular to the direction of protrusion of the electrode lead 400. It is possible to discharge the gases generated inside of the battery casing 300 more effectively, while reducing infiltration of moisture or foreign materials present outside of the battery casing 300 into the battery casing 300, by providing the outer layer 700 having high sealability, and then providing the inner layer 800 having higher air permeability therein. In other words, the gases generated inside of the battery casing 300 may be discharged through the inner layer 800 formed inside, while providing high sealability by the outer layer 700 formed outside. As shown in FIG. 4, the gases generated inside of the battery casing 300 may be discharged to the outside of the battery casing 300 through the inner layer 800.

In addition, as shown in FIG. 3 and FIG. 4, in the direction of the protrusion of the electrode lead 400 (direction in parallel with y axis), the lead film 600 is formed to have a larger length as compared to the upper sealing portion 310S and the lower sealing portion 320S, and thus the lead film 600 may be exposed in each of the internal part and external part of the battery casing 300. Since the outer layer 700 has a certain degree of air permeability, not as high as the air permeability of the inner layer 800, the gases generated inside of the battery casing 300 may be discharged to the outside not only through the inner layer 800 but also through the outer layer 700.

It is possible to control the gas discharge amount by controlling the exposed area of the lead film 600 in each of the internal part and the external part of the battery casing 300.

According to an embodiment of the present disclosure, the exposed area of the lead film 600 in the external part of the battery casing 300 may be the same as the exposed area of the lead film 600 in the internal part of the battery casing 300. According to another embodiment of the present disclosure, the exposed area of the lead film 600 in the external part of the battery casing 300 may be larger than the exposed area of the lead film 600 in the internal part of the battery casing 300. The gas discharge amount is in proportion to the gas discharge area and pressure. Since the pressure in the internal part of the battery casing 300 is larger than the pressure in the external part of the battery casing 300, the gases generated inside of the battery casing 300 may be discharged to the outside more easily, when the exposed area of the lead film 600 in the external part of the battery casing 300 is larger than the exposed area of the lead film 600 in the internal part of the battery casing 300.

According to an embodiment of the present disclosure, the exposed area of the lead film 600 in the external part of the battery casing 300 may be 40-80 mm². This is such a size that about 0.5-3 cc of gases may be discharged per day at 60° C. based on an internal pressure of 1 atm. In addition, this is such a size that the moisture infiltration amount may be 0.02-0.2 g at 25° C. under 50% RH for 10 years.

Meanwhile, the lead film 600 may have a larger width and a smaller length as compared to the electrode lead 400. In this manner, the lead film 600 can prevent the lateral side of the electrode lead 400 from being exposed to the outside, while not interrupting the electrical connection of the electrode lead 400.

Herein, referring to FIG. 4, in the external part of the battery casing 300, one end 800E1 of the inner layer 800 may be exposed to the outside to increase the gas discharge effect. In this manner, the gases inside of the battery casing 300 may be discharged to the outside of the battery casing 300 in the direction of y axis through one end 800E1 of the inner layer 800. In addition, the outer layer 700 is provided with a certain degree of air permeability, not as high as the air permeability of the inner layer 800, and thus the gases inside of the battery casing, diffused to the inner layer 800, may also be discharged in the direction of z axis through the outer layer 700. For example, the gases inside of the battery may be discharged along the z axis through the outer layer 700 exposed to the external part of the battery casing 300.

In addition, in the internal part of the battery casing 300, the other end 800E2 of the inner layer 800 may be formed to be covered with the outer layer 700. Herein, one end 800E1 and the other end 800E2 of the inner layer 800 may be both opposite ends. Depending on the material used for the inner layer 800, the inner layer 800 for gas permeation may react with the electrolyte in the battery casing 300 to affect the internal constitutional parts and to affect the battery performance adversely. Therefore, in this embodiment, the inner layer 800 may be formed in such a manner that it may not be directly exposed inside of the battery casing 300, thereby providing an advantage in that it is possible to guide gas discharge, while protecting the internal constitutional parts, as compared to simple layered arrangement of the gas permeable layer. In other words, when the material used for the inner layer 800 is one that may react with the electrolyte in the battery casing 300, it is preferred that the other end 800E2 of the inner layer 800 is formed to be covered with the outer layer 700 as mentioned above.

Hereinafter, the lead film 600a according to another embodiment of the present disclosure will be explained in detail with reference to FIG. 6 and FIG. 7. However, description of a part overlapping with the above-described content will be omitted.

Figure 6:
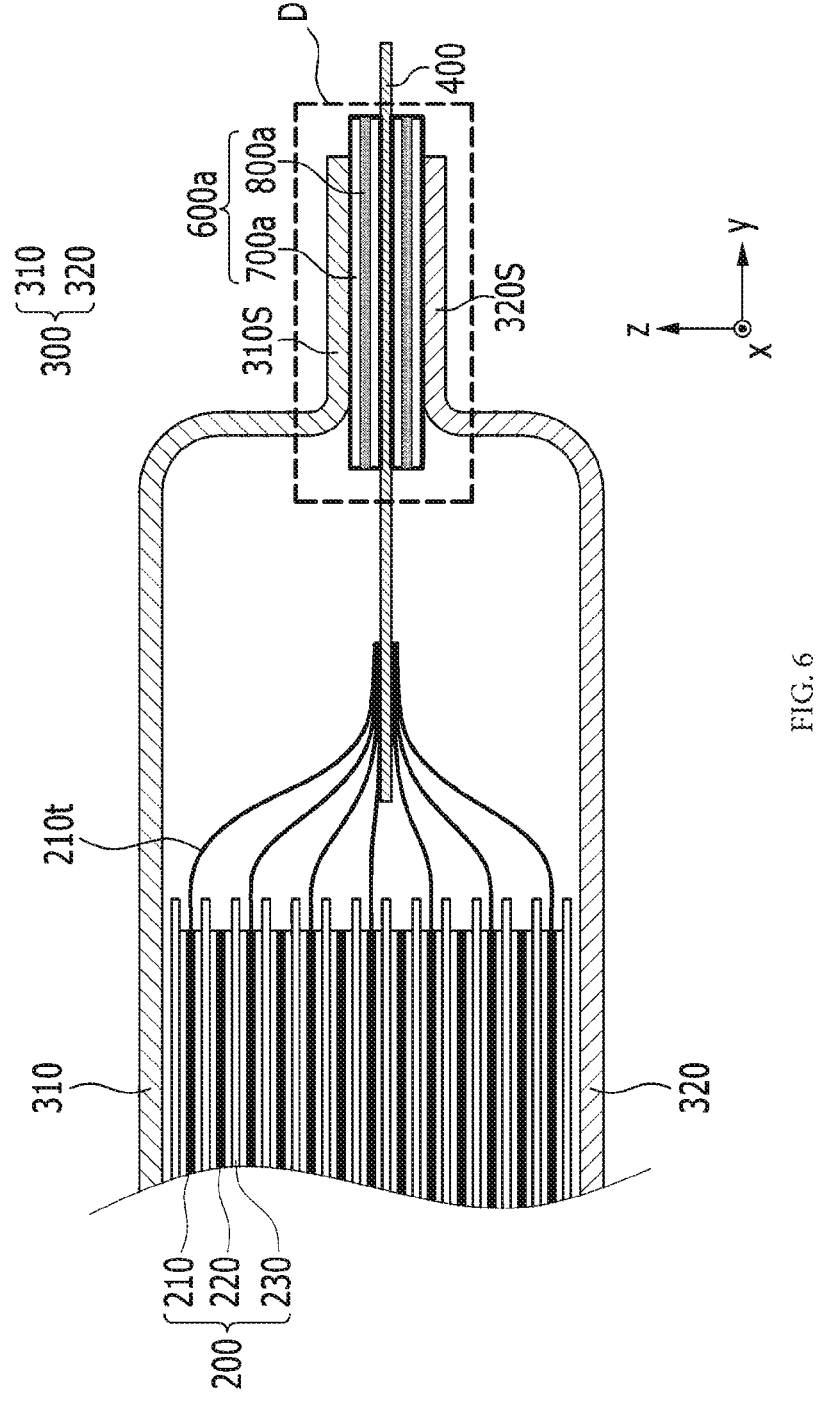
FIG. 6 is a sectional view of the secondary battery according to another embodiment of the present disclosure.

FIG. 6 is a sectional view of the secondary battery according to another embodiment of the present disclosure. FIG. 7 is a partial sectional view taken by enlarging portion "D" in FIG. 6. Herein, FIG. 6 corresponds to the sectional view taken by yz plane in FIG. 2, like the sectional view of FIG. 3.

Figure 7:
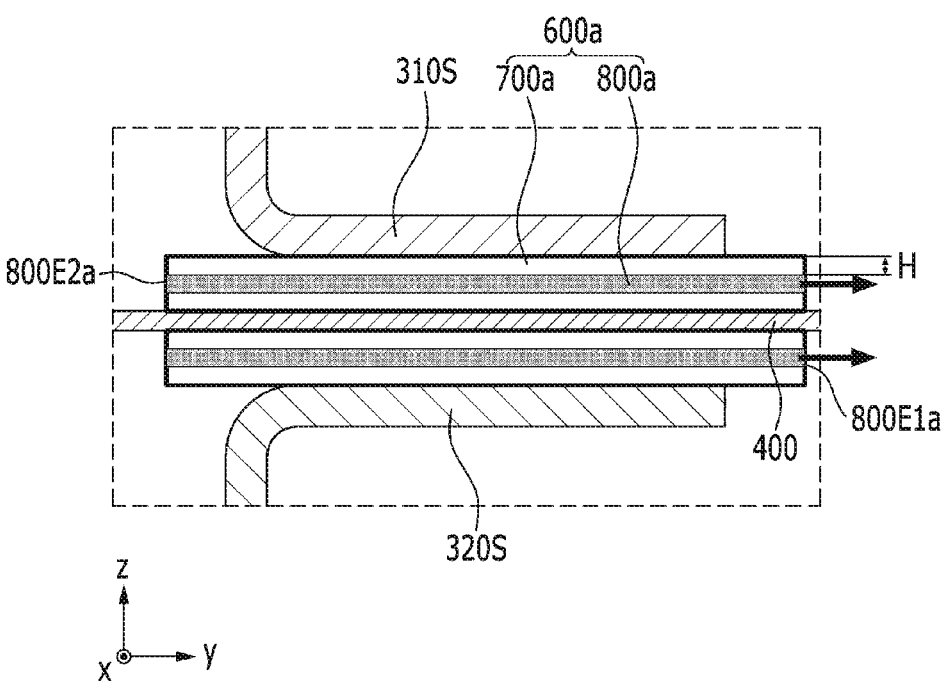
FIG. 7 is a partial sectional view taken by enlarging portion "D" in FIG. 6.

Referring to FIG. 6 and FIG. 7, the lead film 600a according to another embodiment of the present disclosure includes an adhesive outer layer 700a and an air permeable inner layer 800a.

Herein, one end 800E1a of the inner layer 800a may be exposed to the outside in the external part of the battery casing 300, and the other end 800E2a of the inner layer 800a may be exposed to the internal space of the battery casing 300 in the internal part of the battery casing 300. In this manner, it is possible to maximize the gas discharge effect. Herein, one end 800E1a and the other end 800E2a of the inner layer 800a may be both opposite ends. In other words, both ends 800E1a, 800E2a opposite to each other may be exposed to increase the gas discharge effect.

Herein, the inner layer 800a preferably includes a material which is stable in the environment of an electrolyte, i.e. which does not react with the electrolyte in the battery casing 300. For example, the inner layer 800a may include at least one material selected from the group consisting of polypropylene, polyvinyl difluoride (PVDF) and polytetrafluoroethylene.

Hereinafter, the lead film 600b according to still another embodiment of the present disclosure will be explained in detail with reference to FIG. 8. However, description of a part overlapping with the above-described content will be omitted.

Figure 8:
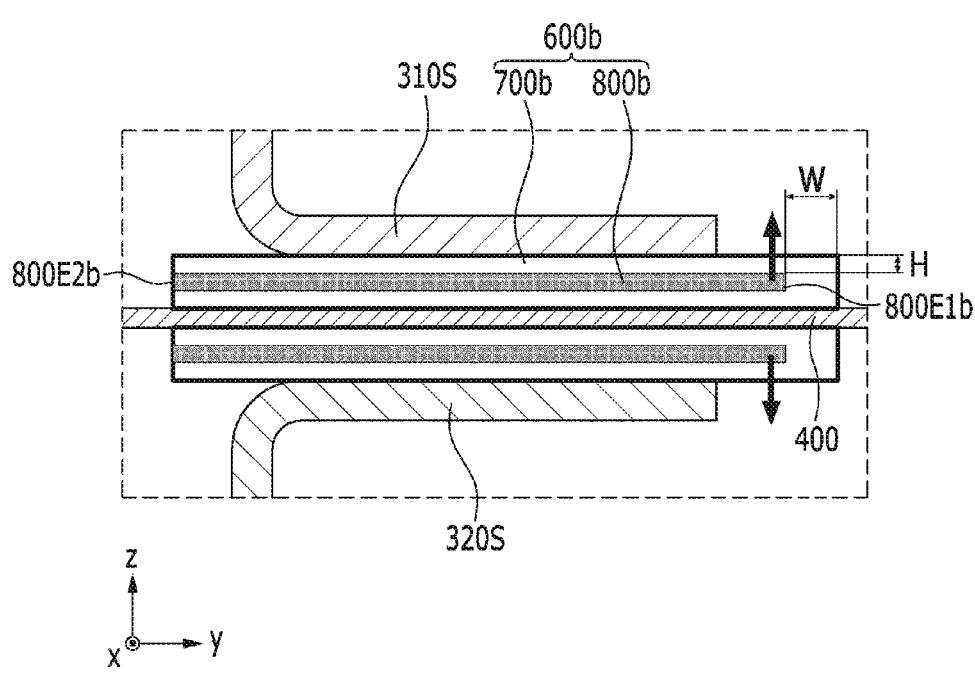
FIG. 8 is a sectional view of the secondary battery according to still another embodiment of the present disclosure.

FIG. 8 is a sectional view of the secondary battery according to still another embodiment of the present disclosure. FIG. 8 corresponds to the sectional view taken by yz plane, like the sectional view of FIG. 4.

Referring to FIG. 8, the lead film 600b according to still another embodiment of the present disclosure includes an adhesive outer layer 700b and an air permeable inner layer 800b.

Herein, in the external part of the battery casing 300, one end 800E1b of the inner layer 800b is covered with the outer layer 700b. In addition, in the internal part of the battery casing 300, the other end 800E2b of the inner layer 800b may be exposed to the internal space of the battery casing 300. Since one end 800E1b of the inner layer 800b is covered with the outer layer 700b, the gases generated inside of the battery casing 300 may be discharged along the direction of Z axis by way of the inner layer 800b and the outer layer 700b sequentially. For example, when the lead film 600 is exposed to the outside of the battery casing 300, the gases generated inside of the battery casing 300 may be discharged along the direction of Z axis by way of the inner layer 800b and the outer layer 700b exposed to the outside of the battery casing 300 sequentially.

Herein, one end 800E1b and the other end 800E2b of the inner layer 800b may be both opposite ends. When the inner layer 800b having high permeability is exposed to the external environment, there may be a problem in that external ingredients infiltrate into the battery casing 300. Therefore, in this embodiment, the inner layer 800b is configured in such a manner that the inner layer 800b may not be directly exposed in the external part of the battery casing 300. In this manner, it is possible to reduce a possibility of infiltration of external ingredients as compared to simple layered arrangement of the gas permeable layer. Instead of this, the other end 800E2b of the inner layer 800b may be exposed in the internal space of the battery casing 300 to supplement the gas discharge effect. Herein, as mentioned above, the inner layer 800b preferably includes a material which is stable in the environment of an electrolyte, i.e. which does not react with the electrolyte in the battery casing 300. For example, the inner layer 800a may include at least one material selected from the group consisting of polypropylene, polyvinyl difluoride (PVDF) and polytetrafluoroethylene.

Referring to FIG. 8, according to an embodiment of the present disclosure, in the external part of the battery casing 300, the lead film 600b of the outer layer 700b covering one end of the inner layer 800b may have a width W of 2 mm or more, or 2-3 mm, in the direction of electrode lead extension. When the width of the lead film 600b of the outer layer 700b covering one end of the inner layer 800b in the direction of electrode lead extension satisfies the above-defined range, it is possible to easily prevent the lead film 600b from being torn, while the gases generated inside of the battery casing 300 is discharged to the outside.

Hereinafter, the lead film 600c according to still another embodiment of the present disclosure will be explained in detail with reference to FIG. 9. However, description of a part overlapping with the above-described content will be omitted.

Figure 9:
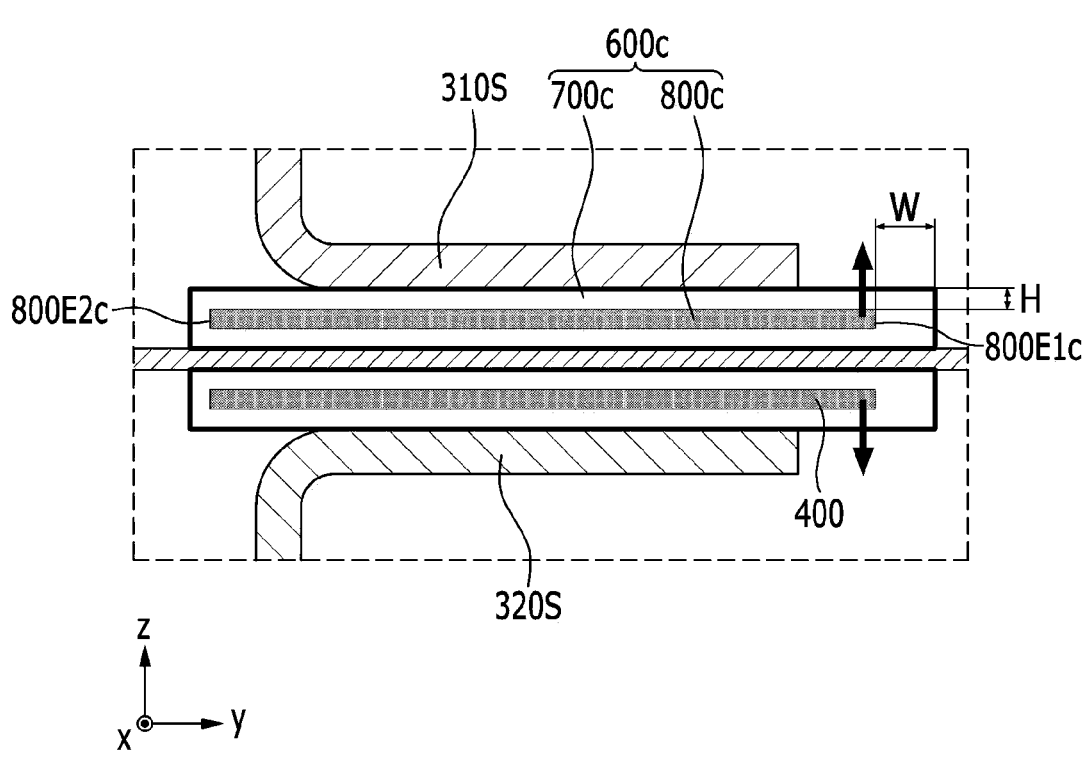
FIG. 9 is a sectional view of the secondary battery according to yet another embodiment of the present disclosure.

FIG. 9 is a sectional view of the secondary battery according to still another embodiment of the present disclosure. FIG. 9 corresponds to the sectional view taken by yz plane, like the sectional view of FIG. 4.

Referring to FIG. 9, the lead film 600c according to still another embodiment of the present disclosure includes an adhesive outer layer 700c and an air permeable inner layer 800c.

Herein, one end 800E1c of the inner layer 800c in the external part of the battery casing 300 and the other end 800E2c of the inner layer 800c in the internal part of the battery casing 300 may be covered with the outer layer 700c. Herein, one end 800E1c and the other end 800E2c of the inner layer 800c may be both opposite ends. As described above, it is likely that the inner layer 800c for gas permeation reacts with the electrolyte in the battery casing 300 to affect the internal constitutional parts and to affect the battery performance adversely. In addition, when the inner layer 800c having high permeability is exposed to the external environment, there is a problem in that the external ingredients may infiltrate into the battery casing 300. Therefore, according to this embodiment, it is intended to reduce such a risk of reaction of the inner layer 800c with the electrolyte in the battery casing 300 and to alleviate the possibility of infiltration of the external materials by covering both opposite ends 800E1c, 800E2c of the inner layer 800c with the outer layer 700c.

Meanwhile, referring to FIG. 3, FIG. 4, FIG. 7, FIG. 8 and FIG. 9, one end 800E1, 800E1a, 800E1b, 800E1c of the lead film 600, 600a, 600b, 600c according to each embodiment may be disposed further outside than the outer surface of the battery casing 300. In addition, the other end 800E2, 800E2a, 800E2b, 800E2c of the lead film 600, 600a, 600b, 600c may be disposed further inside than the inner surface of the battery casing 300.

In this manner, the lead film 600, 600a, 600b, 600c may have a maximized area of inner layer 800, 800a, 800b, 800c, and thus it is possible to discharge the gases generated inside of the battery casing 300 effectively.

Hereinafter, the specific constitution of the lead film according to an embodiment of the present disclosure will be explained with reference to FIG. 10.

Figure 10:
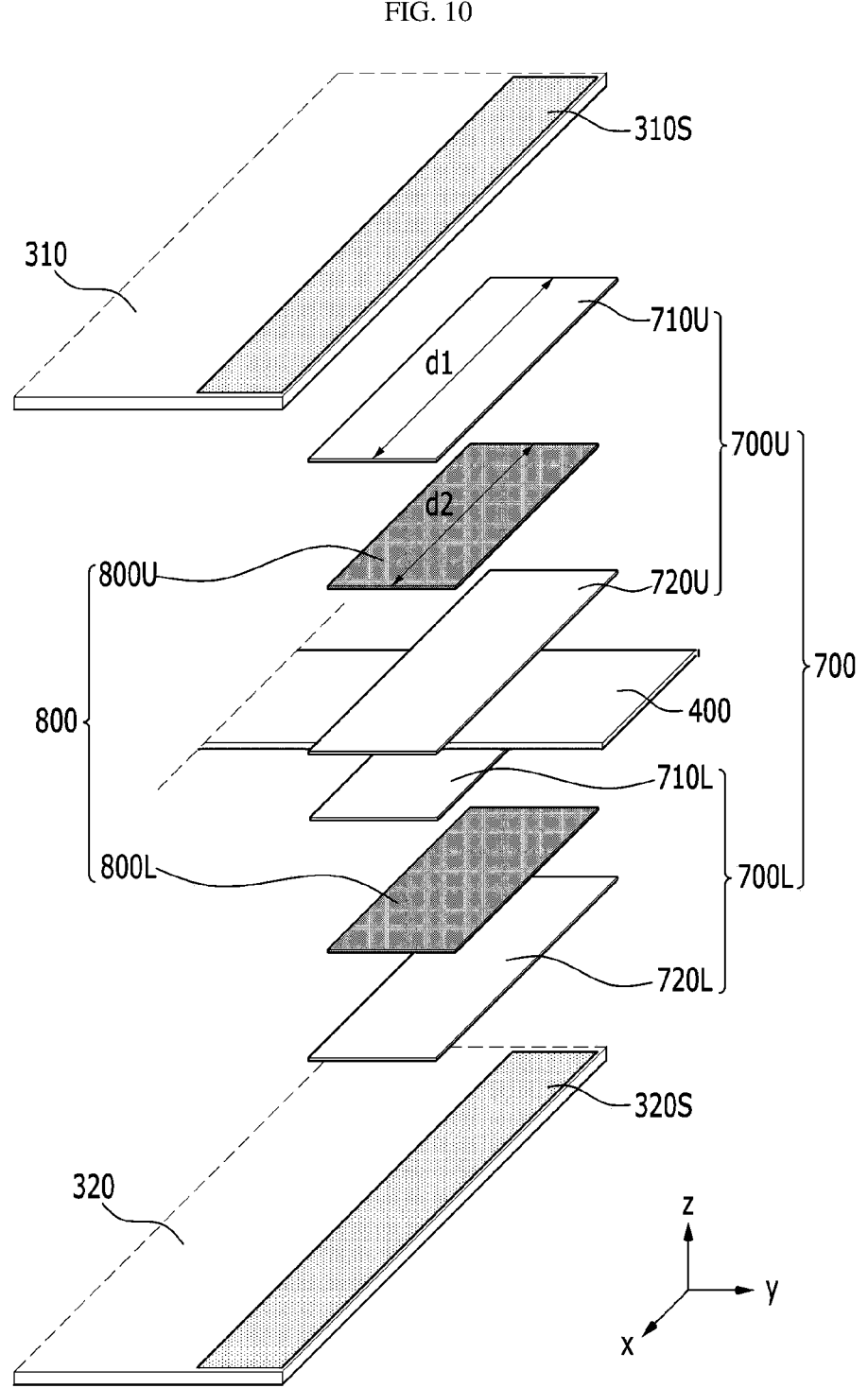
FIG. 10 is a schematic view illustrating the specific constitution of the lead film according to an embodiment of the present disclosure.

FIG. 10 is a schematic view illustrating the specific constitution of the lead film according to an embodiment of the present disclosure.

Referring to FIG. 10, the lead film according to an embodiment of the present disclosure includes an adhesive outer layer 700 and an air permeable inner layer 800 as mentioned above.

Herein, the outer layer 700 may include an upper outer layer 700U disposed between the upper sealing portion 310S of the upper casing 310 and the electrode lead 400, and a lower outer layer 700L disposed between the lower sealing portion 320S of the lower casing 320 and the electrode lead 400. Meanwhile, the inner layer 800 may include an upper inner layer 800U covered with the upper outer layer 700U and a lower inner layer 800L covered with the lower outer layer 700L.

In addition, the upper outer layer 700U may include a first upper outer layer 710U and a second upper outer layer 720U, and the upper inner layer 800U may be disposed between the first upper outer layer 710U and the second upper outer layer 720U. Herein, the width d1 of the first upper outer layer 710U and the second upper outer layer 720U may be larger than the width d2 of the upper inner layer 800U in the direction (direction in parallel with x axis) perpendicular to the direction of the protrusion of the electrode lead 400.

Further, the lower outer layer 700L may include a first lower outer layer 710L and a second lower outer layer 720L, and the lower inner layer 800L may be disposed between the first lower outer layer 710 and the second lower outer layer 720L. Similarly to the upper outer layer 700U, the width of the first lower outer layer 710L and the second lower outer layer 720L may be larger than the width of the lower inner layer 800L in the direction (direction in parallel with x axis) perpendicular to the direction of the protrusion of the electrode lead 400.

In this embodiment, when binding the first upper outer layer 710U, the upper inner layer 800U, the second upper outer layer 720U, the first lower outer layer 710L, the lower inner layer 800L and the second lower outer layer 720L, heat and pressure are applied to the adjacent layers to perform binding, and then the next layer is disposed and heat and pressure are further applied thereto to perform binding. In other words, application of heat and pressure to both opposite layers may be carried out repeatedly for each layer to obtain the lead film according to this embodiment.

The upper outer layer 710U, the second upper outer layer 720U, the first lower outer layer 710L and the second lower outer layer 720L are bound to one another to form the outer layer 700 covering the electrode lead 400. Referring to FIG. 4, FIG. 7, FIG. 8 and FIG. 9, a part of the outer layer 700, 700a, 700b, 700c may be disposed between the inner layer 800, 800a, 800b, 800c and one surface of the electrode lead 400. In other words, the inner layer 800, 800a, 800b, 800c may not be in direct contact with the electrode lead 400. This is because the second upper outer layer 720U is disposed between the upper inner layer 800U and the electrode lead 40, and the first lower outer layer 710L is disposed between the lower inner layer 800L and the electrode lead 400, as shown in FIG. 10.

In addition, as described above, the width d1 of the first upper outer layer 710U, the second upper outer layer 720U, the first lower outer layer 710L and the second lower outer layer 720L may be formed to be larger than the width d2 of the upper inner layer 800U and the lower inner layer 800L in the direction (direction in parallel with x axis) perpendicular to the direction of the protrusion of the electrode lead 400, thereby allowing the inner layer 800 to be disposed inside of the outer layer 700.

Further, the length of each of the upper outer layer 700U, the lower outer layer 700L, the upper inner layer 800U and the lower inner layer 800L may be formed to be larger than the length of the upper sealing portion 310S and the lower sealing portion 320S in the direction (direction in parallel with y axis) of the protrusion of the electrode lead 400, thereby allowing the lead film according to this embodiment to be exposed to each of the internal part and external part of the battery casing 300.

Figure 11:
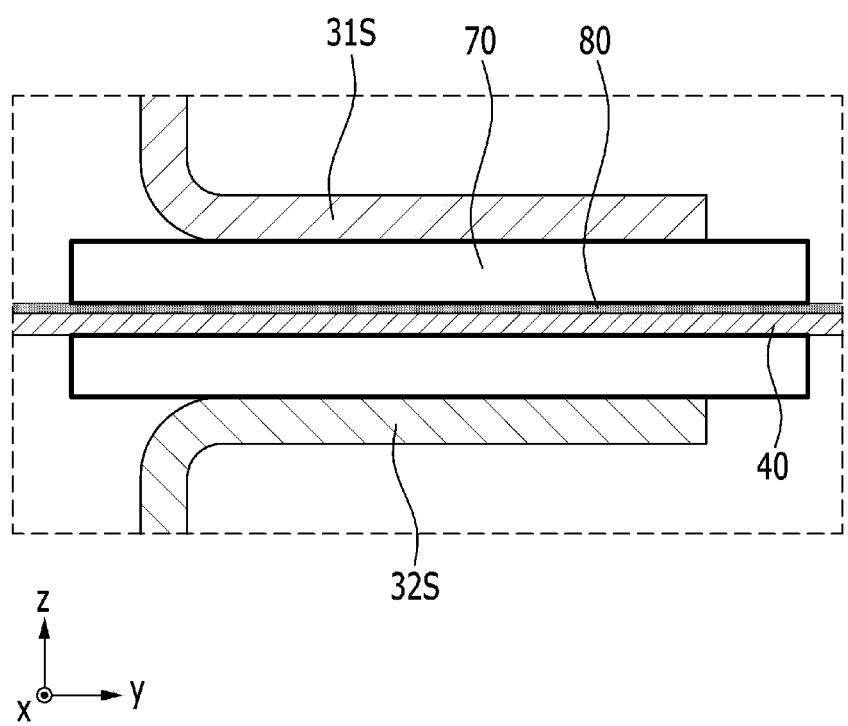
FIG. 11 is a partial sectional view illustrating the shape of the lead film according to Comparative Example.

Hereinafter, the advantages of the lead film according to an embodiment of the present disclosure will be explained in detail as compared to the lead film of Comparative Example as shown in FIG. 11.

FIG. 11 is a partial sectional view illustrating the shape of the lead film according to Comparative Example.

Referring to FIG. 11, according to Comparative Example, an electrode lead 40 protrudes out by way of the gap between an upper sealing portion 310S and a lower sealing portion 320S, and the electrode lead 40 is covered with a lead film 70 between the upper sealing portion 310S and the lower sealing portion 320S. Herein, a gas permeable layer 80 for gas permeation may be formed on one surface of the electrode lead 40, and the gas permeable layer may be a metallic permeable layer including a metal or alloy material. Since the lead film 70 includes a polymer resin for the purpose of electrical insulation and sealing, the gas permeable layer 80 including a metal or alloy material may be problematic in terms of the lamination capability with the lead film 70, which may adversely affect the sealability of a secondary battery.

Unlike Comparative Example, the lead film 600 of the present disclosure as shown in FIG. 3, FIG. 4, FIG. 7, FIG. 8 and FIG. 9, i.e. the lead film 600, 600*a*, 600*b*, 600*c* includes the inner layer 800, 800*a*, 800*b*, 800*c* having relatively higher air permeability and disposed inside of the outer layer 700, 700*a*, 700*b*, 700*c*. Therefore, there is an advantage in that a gas discharge path can be provided in the battery casing 300 with no problem of degradation of sealability.

In addition, referring to FIG. 3, FIG. 4, FIG. 7, FIG. 8 and FIG. 9, the lead film 600, 600*a*, 600*b*, 600*c* includes the inner layer 800, 800*a*, 800*b*, 800*c* disposed inside of the outer layer 700, 700*a*, 700*b*, 700*c*, and the outer surface of the inner layer 800, 800*a*, 800*b*, 800*c* and the inner surface of the outer layer 700, 700*a*, 700*b*, 700*c* are adhered to each other.

Herein, such adhesion covers melt fusion between the outer layer 700, 700*a*, 700*b*, 700*c* and the inner layer 800, 800*a*, 800*b*, 800*c* through the application of heat or pressure, as well as adhesion between them by way of a separate adhesive.

Since the inner layer 800, 800*a*, 800*b*, 800*c* includes a material having relatively high air permeability and is adhered to the outer layer 700, 700*a*, 700*b*, 700*c*, it may function as a kind of physical support. In other words, according to these embodiments of the present disclosure, the inner layer 800, 800*a*, 800*b*, 800*c* not only functions as a gas discharge path but also functions to supplement the durability and rigidity of the lead film 600, 600*a*, 600*b*, 600*c*. In this manner, it is possible to prevent the problem occurring in Comparative Example, i.e. expansion of the lead film in the upward and downward directions and partial elongation of the lead film.

Hereinafter, the lead film according to another embodiment of the present disclosure will be explained with reference to FIG. 12 and FIG. 13.

Figure 12:
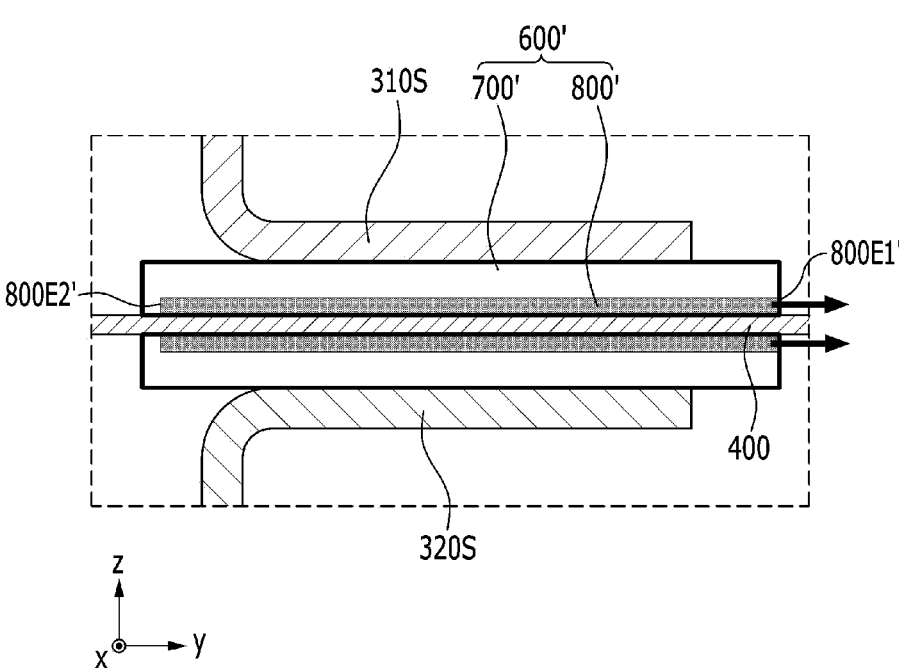
FIG. 12 and FIG. 13 are sectional views each illustrating the shape of the lead film according to another embodiment of the present disclosure.
Figure 13:
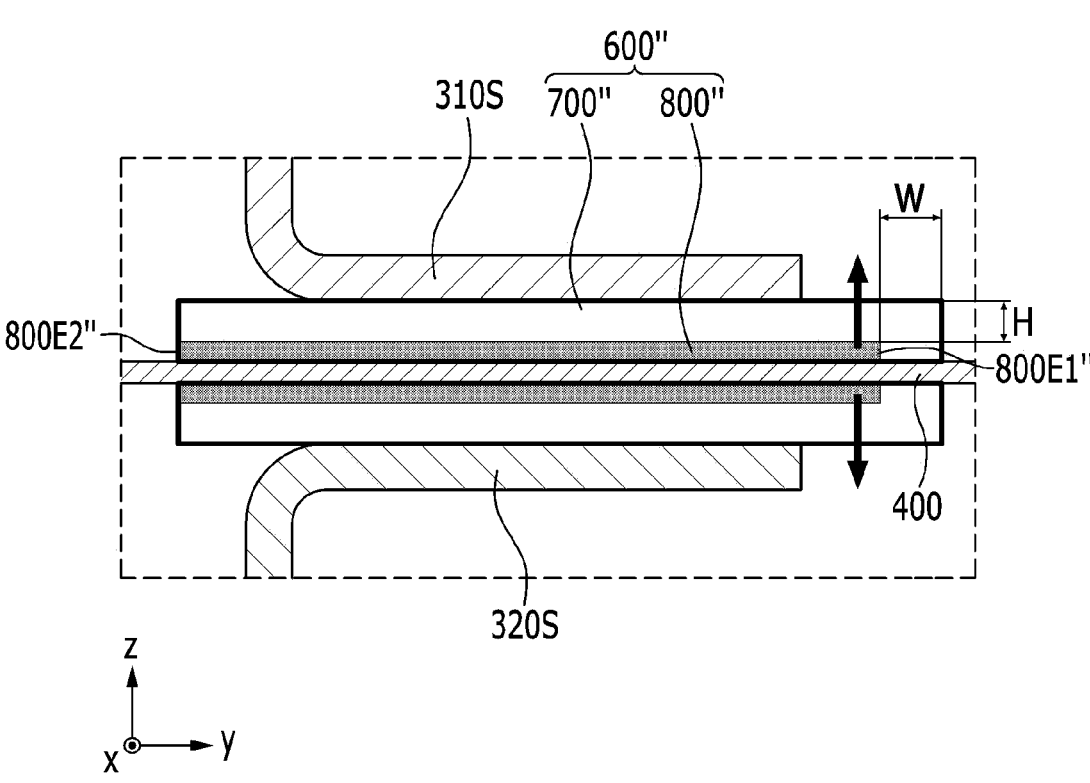

FIG. 12 and FIG. 13 are sectional views each illustrating the shape of the lead film according to another embodiment of the present disclosure.

Referring to FIG. 12 and FIG. 13, the lead film 600', 600" may include an outer layer 700', 700" and an inner layer 800', 800". Description of the outer layer 700', 700" and the inner layer 800', 800" is overlapped with the above-described content and will be omitted. However, in these embodiments, the inner layer 800', 800" may be adhered to one surface of the electrode lead 400. The inner layer 800', 800" disposed at the top may be in contact with the top surface of the electrode lead 400, and the inner layer 800', 800" disposed at the bottom may be in contact with the bottom surface of the electrode lead 400. Unlike the embodiments as shown in FIG. 4, FIG. 7, FIG. 8 and FIG. 9, a part of the outer layer is not disposed between the inner layer 800, 800' and the electrode lead 400.

FIG. 12 illustrates that one end 800E1' of the inner layer 800' is opened and the other end 800E2' is covered with the outer layer 700', and FIG. 13 illustrates that one end 800E1" of the inner layer 800" is covered with the outer layer 700" and the other end 800E2" is opened. Although it is not specifically shown, both one end and the other end of the inner layer may be opened or may be covered with the outer layer.

Referring to FIG. 10, the lead film 600', 600" as shown in FIG. 12 and FIG. 13 may be obtained by eliminating the second upper layer 720U and the first lower outer layer

710L. In other words, the lead film 600', 600" having the inner layer 800', 800" that is in contact with one surface of the electrode lead 400 uses a reduced number of layers requiring hot fusion during the manufacture, and thus the hot fusion steps are reduced partially. Therefore, there are advantages in terms of the manufacturing process and cost savings.

According to the present disclosure, several terms for direction, such as front, rear, left, right, top and bottom, are used, but they are used merely for convenience in description and may vary depending on the position of an object or observer.

A plurality of the above-described secondary batteries may be assembled to form a battery module. Such a battery module may be mounted together with various controlling and protecting systems, such as a battery management system (BMS) and cooling system, to form a battery pack.

The secondary battery, the battery module or the battery pack may be applied to various devices, particularly, transport means, including electric bikes, electric vehicles and hybrid vehicles, but are not limited thereto. Therefore, the secondary battery, the battery module or the battery pack may be applied to various devices to which secondary batteries are applicable.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The invention claimed is:

1. A secondary battery comprising:
an electrode assembly comprising electrode sheets and a separator interposed between the electrode sheets;
a battery casing in which the electrode assembly is received;
an electrode lead connected to the electrode assembly and protruding out from the battery casing; and
a lead film covering the electrode lead and interposed between the electrode lead and the battery casing,
wherein the lead film comprises an outer layer covering the electrode lead and an inner layer disposed inside of the outer layer, and
the inner layer comprises a material having a higher air permeability as compared to the outer layer.

2. The secondary battery according to claim 1, wherein the outer surface of the inner layer and the inner surface of the outer layer are adhered to each other.

3. The secondary battery according to claim 1, wherein one end of the inner layer is exposed to the outside in the external part of the battery casing, and the other end of the inner layer is covered with the outer layer in the internal part of the battery casing.

4. The secondary battery according to claim 1, wherein one end of the inner layer is exposed to the outside in the external part of the battery casing, and the other end of the inner layer is exposed to the internal space of the battery casing in the internal part of the battery casing.

5. The secondary battery according to claim 1, wherein one end of the inner layer is covered with the outer layer in the external part of the battery casing, and the other end of the inner layer is exposed to the internal space of the battery casing in the internal part of the battery casing.

6. The secondary battery according to claim 1, wherein one end of the inner layer is covered with the outer layer in the external part of the battery casing, and the other end of the inner layer is covered with the outer layer in the internal part of the battery casing.

7. The secondary battery according to claim 5, wherein the lead film of the outer layer covering one end of the inner layer in the external part of the battery casing has a width of 2 mm or more in the direction of extension of the electrode lead.

8. The secondary battery according to claim 1, wherein the outer layer has a thickness of 100-300 μm between the inner layer and the battery casing.

9. The secondary battery according to claim 1, wherein the inner layer has a thickness of 50-150 μm.

10. The secondary battery according to claim 1, wherein the outer layer has a gas permeability of 4-40 barrier at 60° C.

11. The secondary battery according to claim 1, wherein the outer layer has a water infiltration amount of 0.02-0.2 g at 25° C. and 50% RH for 10 years.

12. The secondary battery according to claim 1, wherein the inner layer has a gas permeability of $1.6 \ e^5$ to $1.6 \ e^7$ barrier.

13. The secondary battery according to claim 1, wherein the outer layer comprises a polyolefin-based resin, and the polyolefin-based resin comprises at least one material selected from the group consisting of polypropylene, polyethylene and polyvinyl difluoride (PVDF).

14. The secondary battery according to claim 1, wherein the inner layer comprises at least one material selected from the group consisting of polyolefin-based resin, fluorinated resin, natural materials, glass fibers, ceramic fibers and metal fibers.

15. The secondary battery according to claim 14, wherein the polyolefin-based resin comprises at least one material selected from the group consisting of polypropylene, polyethylene and polyvinyl difluoride (PVDF), the fluorinated resin comprises at least one material selected from the group consisting of polytetrafluoroethylene and polyvinylidene fluoride, and the natural material comprises at least one material selected from the group consisting of cotton and wool.

16. The secondary battery according to claim 1, wherein the outer layer is partially disposed between the inner layer and one surface of the electrode lead.

17. The secondary battery according to claim 1, wherein the battery casing comprises an upper casing and a lower casing, the upper sealing portion of the upper casing and the lower sealing portion of the lower casing are bound to each other, and the lead film is disposed between the upper sealing portion and the lower sealing portion.

18. The secondary battery according to claim 17, wherein the lead film is formed to have a larger length as compared to the upper sealing portion and the lower sealing portion in the direction of protrusion of the electrode lead, and the lead film is exposed in each of the internal part and external part of the battery casing.

19. The secondary battery according to claim 18, wherein the area of the lead film exposed outside of the battery casing is the same as the area of the lead film exposed inside of the battery casing.

20. The secondary battery according to claim 18, wherein the area of the lead film exposed outside of the battery casing is larger than the area of the lead film exposed inside of the battery casing.

21. The secondary battery according to claim 17, wherein the outer layer comprises an upper outer layer disposed between the upper sealing portion and the electrode lead, and a lower outer layer disposed between the lower sealing portion and the electrode lead.

22. The secondary battery according to claim 21, wherein the inner layer comprises an upper inner layer covered with the upper outer layer, and a lower inner layer covered with the lower outer layer.

23. The secondary battery according to claim 22, wherein the upper outer layer comprises a first upper outer layer and a second upper outer layer, and the upper inner layer is disposed between the first upper outer layer and the second upper outer layer.

24. The secondary battery according to claim 22, wherein the lower outer layer comprises a first lower outer layer and a second lower outer layer, and the lower inner layer is disposed between the first lower outer layer and the second lower outer layer.

25. The secondary battery according to claim 1, wherein the inner layer is in contact with one surface of the electrode lead.

26. A battery module comprising the secondary battery as defined in claim 1.

* * * * *